United States Patent
Subramanian et al.

(10) Patent No.: US 12,554,967 B2
(45) Date of Patent: Feb. 17, 2026

(54) USING NEGATIVE EVIDENCE TO PREDICT EVENT DATASETS

(71) Applicant: INTERNATIONAL BUSINESS MACHINES CORPORATION, Armonk, NY (US)

(72) Inventors: Dharmashankar Subramanian, White Plains, NY (US); Tian Gao, Berkeley Heights, NJ (US); Karthikeyan Shanmugam, Elmsford, NY (US); Debarun Bhattacharjya, New York, NY (US); Nicholas Scott Mattei, New Orleans, LA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1054 days.

(21) Appl. No.: 16/894,970

(22) Filed: Jun. 8, 2020

(65) Prior Publication Data

US 2021/0383194 A1    Dec. 9, 2021

(51) Int. Cl.
    *G06N 3/044* (2023.01)
    *G06N 3/045* (2023.01)
    *G06N 3/08* (2023.01)

(52) U.S. Cl.
    CPC .............. *G06N 3/044* (2023.01); *G06N 3/045* (2023.01); *G06N 3/08* (2013.01)

(58) Field of Classification Search
    CPC ........... G06N 3/044; G06N 3/045; G06N 3/08
    See application file for complete search history.

(56) References Cited

U.S. PATENT DOCUMENTS

| | | |
|---|---|---|
| 8,538,911 B2 | 9/2013 | Kass et al. |
| 8,655,812 B2 | 2/2014 | Chang et al. |

(Continued)

FOREIGN PATENT DOCUMENTS

| | | | | |
|---|---|---|---|---|
| WO | WO-2018094294 A1 * | 5/2018 | ............ | G06N 3/045 |
| WO | WO-2018094295 A1 * | 5/2018 | ............ | G06N 3/044 |
| WO | WO-2018094296 A1 * | 5/2018 | ............ | G06N 3/045 |

OTHER PUBLICATIONS

Gao, T., Subramanian, D., Shanmugam, K., Bhattacharjya, D., & Mattei, N. (2020, April). A multi-channel neural graphical event model with negative evidence. In Proceedings of the AAAI Conference on Artificial Intelligence (vol. 34, No. 04, pp. 3946-3953). (Year: 2020).*

(Continued)

*Primary Examiner* — Marshall L Werner
(74) *Attorney, Agent, or Firm* — Tutunjian & Bitetto, P.C.; Stosch Sabo

(57) ABSTRACT

A computer-implemented method is presented for learning relationships between multiple event types by employing a multi-channel neural graphical event model (MCN-GEM). The method includes receiving, by a computing device, time-stamped, asynchronous, irregularly spaced event epochs, generating, by the computing device, at least one fake epoch between each inter-event interval, wherein fake epochs represent negative evidence, feeding the event epochs and the at least one fake epoch into long short term memory (LSTM) cells, computing hidden states for each of the event epochs and the at least one fake epoch, feeding the hidden states into spatial and temporal attention models, and employing an average attention across all event epochs to generate causal graphs representing causal relationships between all the event epochs.

20 Claims, 10 Drawing Sheets

(56) References Cited

U.S. PATENT DOCUMENTS

| | | | |
|---|---|---|---|
| 9,361,290 | B2 | 6/2016 | Bruss et al. |
| 11,170,158 | B2* | 11/2021 | Cohan .................. G06N 3/09 |
| 2015/0095216 | A1 | 4/2015 | Van Heerden et al. |
| 2016/0148091 | A1 | 5/2016 | Nugent et al. |
| 2016/0148094 | A1 | 5/2016 | Jayaraman et al. |
| 2018/0144248 | A1* | 5/2018 | Lu ......................... G06N 3/09 |
| 2019/0318288 | A1 | 10/2019 | Noskov et al. |
| 2019/0370102 | A1 | 12/2019 | Settle |
| 2020/0160176 | A1* | 5/2020 | Mehrasa ............... G06N 3/047 |
| 2020/0169469 | A1* | 5/2020 | Bhattacharjya ........ H04L 67/10 |
| 2021/0248376 | A1* | 8/2021 | Zhao ...................... G06N 3/08 |

OTHER PUBLICATIONS

Gao et al., A Multi-Channel Neural Graphical Event Model with Negative Evidence, In Proceedings of the AAAI Conference on Artificial Intelligence, vol. 34 No. 04, pp. 3946-3953; Apr. 2020. (Year: 2020).*

Bhattacharjya et al., Proximal Graphical Event Models, 32nd Conference on Neural Information Processing Systems, Dec. 2018. (Year: 2018).*

Ding et al., Interpretable Spatio-Temporal Attention LSTM Model for Flood Forecasting, Neurocomputing 403 (2020) pp. 348-359, May 2020. (Year: 2020).*

Grace Period Disclosure: Gao et al., "A Multi-Channel Neural Graphical Event Model with Negative Evidence", arXiv preprint. ArXiv:2002.09575. Feb. 21, 2020. (pp. 1-11.).

Mell et al., "The NIST Definition of Cloud Computing", NIST Special Publication 800-145. Sep. 2011. (pp. 1-7.).

William H. Panning, "Insight: Non-events Matter—Near misses provide important clues for improving risk management", Best's Review—AM Best's Monthly Insurance Magazine. Jan. 2015. vol. 115, Issue 9. http://news.ambest.com/articlecontent.aspx?pc=1009 &AltSrc=108&refnum=232024. Downloaded Mar. 10, 2020. (pp. 1-4.).

Aalen et al., "Survival and Event History Analysis—A Process Point of View", Statistics for Biology and Health, Jan. 2008, 550 pages.

Dahlhaus, "Graphical interaction models for multivariate time series", Metrika 51.2 Aug. 2000, pp. 157-172.

Didelez, Graphical Models for Marked Point Processes based on Local Independence, Journal of the Royal Statistical Society Series B: Statistical Methodology 70.1 (Feb. 2008), pp. 245-264.

Du et al., "Recurrent Marked Temporal Point Processes: Embedding Event History to Vector", Proceedings of the 22nd ACM SIGKDD international conference on knowledge discovery and data mining. Aug. 2016, 10 pages.

Eichler, "Graphical Models in Time Series Analysis", Diss. Universitat, Heidelberg, Jan. 2000, 121 pages.

Ganin et al., "Domain-Adversarial Training of Neural Networks", Journal of Machine Learning Research 17 (2016), Apr. 16, 2016, pp. 1-35, arXiv:1505.07818v4.

Gerner et al., "Conflict and Mediation Event Observations (CAMEO): A New Event Data Framework for the Analysis of Foreign Policy Interactions", International Studies Association (ISA) Annual Convention, 2002, Apr. 2002, 36 pages.

Goodfellow et al., "Generative Adversarial Nets", In Advances in neural information processing systems, Jun. 10, 2014, pp. 2672-2680.

Gopalratnam et al., "Extending Continuous Time Bayesian Networks", In Proceedings of the 20th National Conference on Artificial Intelligence—vol. 2, AAAI'05, Aaai Press, 2005, Jul. 9, 2005, pp. 981-986.

Goulding et al., "Event Series Prediction via Non-homogeneous Poisson Process Modelling", 16th International Conference on Data Mining (ICDM). IEEE, Dec. 2016, 11 pages.

Gunawardana et al., "A Model for Temporal Dependencies in Event Streams", Advances in neural information processing systems 24, Dec. 2011, 9 pages.

Gunawardana et al., "Universal Models of Multivariate Temporal Point Processes", Artificial intelligence and statistics. PMLR, Jun. 2016, 8 pages.

Hawkes Alan G. "Spectra of some self-exciting and mutually exciting point processes", Biometrika, 58, (1), ISSN 00063444, Apr. 1971, pp. 83-90, URL http://www.jstor.org/stable/2334319.

Kanazawa et al., "A Model for Projection and Action", IJCAI. vol. 89, Aug. 1989, 6 pages.

Kingma et al., "Adam: A Method for Stochastic Optimization", Published as a conference paper at ICLR 2015, Jan. 30, 2017, 15 pages, arXiv:1412.6980v9.

Li et al., "Time-Dependent Representation for Neural Event Sequence Prediction", Workshop track—ICLR 2018, Jul. 20, 2018, 11 pages, arXiv:1708.00065v4.

Meek, "Toward Learning Graphical and Causal Process Models", Ci@ UAI. Jul. 2014, 12 pages.

Mei et al., "The Neural Hawkes Process: A Neurally Self-Modulating Multivariate Point Process", 31st Conference on Neural Information Processing Systems (NIPS Dec. 2017), 11 pages.

Murphy, "Dynamic Bayesian Networks: Representation, Inference and Learning", University of California, Berkeley, Sep. 2002, 225 pages.

Nodelman et al., "Continuous Time Bayesian Networks", arXiv preprint arXiv:1301.0591, Dec. 2002, 10 pages.

O'Brien Sean P. "Crisis Early Warning and Decision Support: Contemporary Approaches and Thoughts on Future Research", International Studies Review, Mar. 9, 2010, abstract pages (3 pages), vol. 12, Issue 1 (abstract only).

Rajaram et al., "Poisson-Networks: A Model for Structured Point Processes", International Workshop on Artificial Intelligence and Statistics. PMLR, Jun. 2005, 8 pages.

Simma et al., "CT-NOR: Representing and Reasoning About Events in Continuous Time", Retrieved from: arXiv:1206.3280, Jun. 2012, 10 pages.

Simma et al., "Modeling Events with Cascades of Poisson Processes", University of California, Berkeley, Jan. 2010, 10 pages.

Weiss et al., "Forest-Based Point Process for Event Prediction from Electronic Health Records", Joint european conference on machine learning and knowledge discovery in databases. Berlin, Heidelberg: Springer Berlin Heidelberg, Sep. 2013, 16 pages.

Xiao et al., "Modeling the Intensity Function of Point Process via Recurrent Neural Networks", Proceedings of the Thirty-First AAAI Conference on Artificial Intelligence (AAAI-17), Feb. 2017, 7 pages.

Zhou et al., "Learning Triggering Kernels for Multi-dimensional Hawkes Processes", International conference on machine learning. PMLR, Jun. 2013, 9 pages.

* cited by examiner

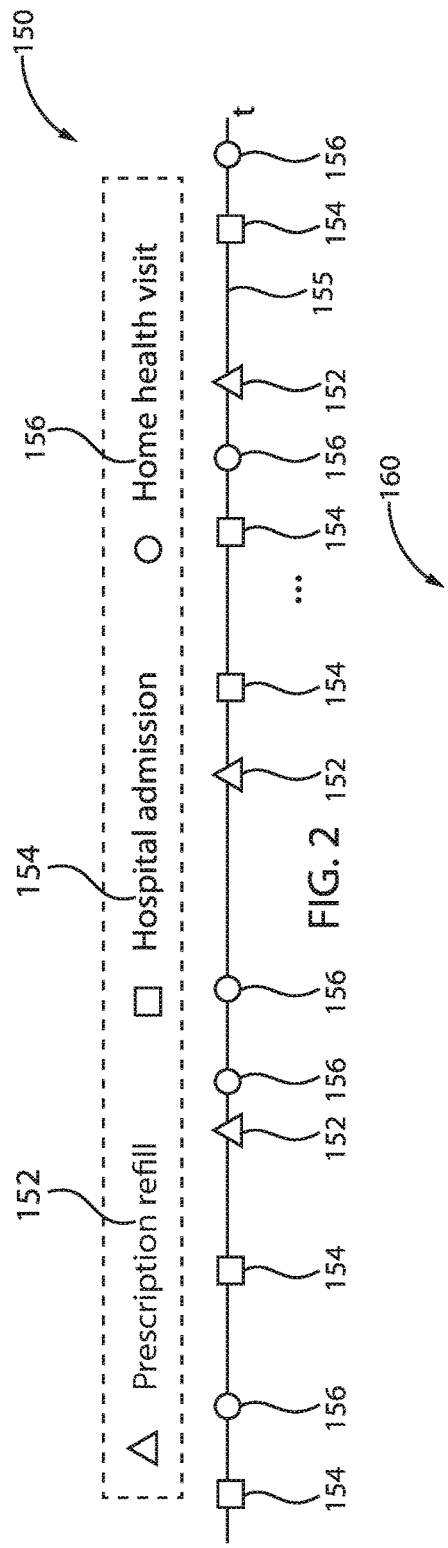
FIG. 2
FIG. 3
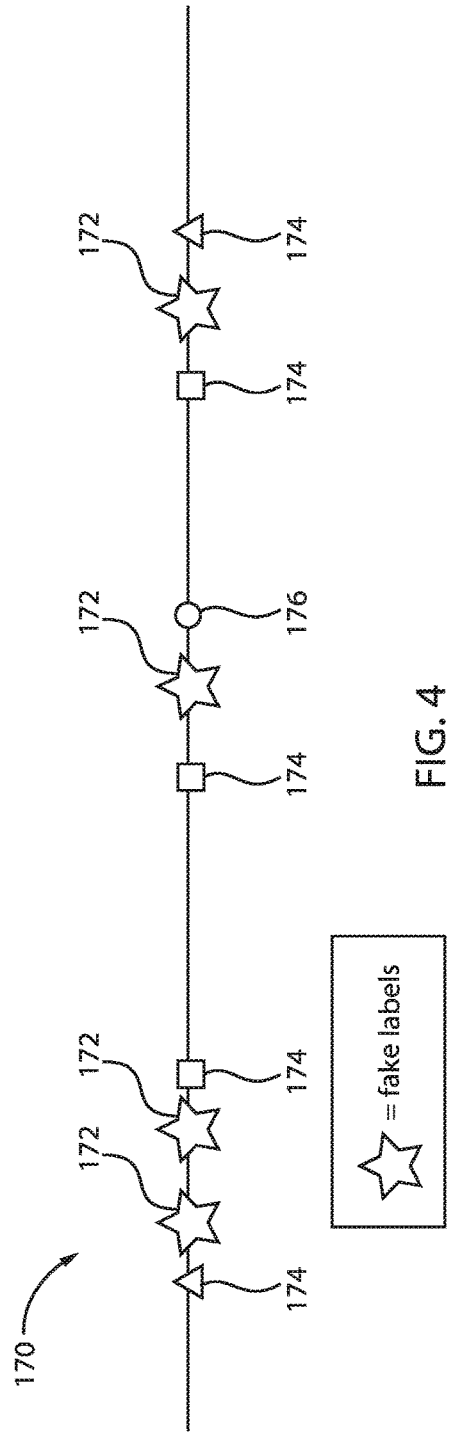
FIG. 4

USING NEGATIVE EVIDENCE TO PREDICT EVENT DATASETS

STATEMENT REGARDING PRIOR DISCLOSURES BY THE INVENTOR OR A JOINT INVENTOR

The following disclosure is submitted under 35 U.S.C. § 102(b)(1)(A): DISCLOSURE: Published on arXiv on Feb. 21, 2020, entitled "A Multi-Channel Neural Graphical Event Model with Negative Evidence," and cited as arXiv: 2002.09575.

BACKGROUND

The present invention relates generally to event datasets, and more specifically, to using negative evidence to predict event datasets.

Event stream data is collected to explore the dynamics and behavior of a wide variety of systems including social networks, biochemical networks, electronic health records, and computer logs in data centers. In a multivariate event stream, events of multiple types (labels) occur at irregularly spaced time stamps on a common timeline. Event models seek to capture the joint stochastic dynamics of such event streams. Multivariate point processes and conditional intensity functions provide the mathematical framework for capturing event dynamics. In this framework, the instantaneous arrival rate of an event type at any point in time usually depends on the history of all historical event arrivals before that point in time.

SUMMARY

In accordance with an embodiment, a method is provided for learning relationships between multiple event types by employing a multi-channel neural graphical event model (MCN-GEM). The method includes receiving, by a computing device, time-stamped, asynchronous, irregularly spaced event epochs, generating, by the computing device, at least one fake epoch between each inter-event interval, wherein fake epochs represent negative evidence, feeding the event epochs and the at least one fake epoch into long short term memory (LSTM) cells, computing hidden states for each of the event epochs and the at least one fake epoch, feeding the hidden states into spatial and temporal attention models, and employing an average attention across all event epochs to generate causal graphs representing causal relationships between all the event epochs.

In accordance with another embodiment, a system is provided for learning relationships between multiple event types by employing a multi-channel neural graphical event model (MCN-GEM). The system includes a memory and one or more processors in communication with the memory configured to receive, by a computing device, time-stamped, asynchronous, irregularly spaced event epochs, generate, by the computing device, at least one fake epoch between each inter-event interval, wherein fake epochs represent negative evidence, feed the event epochs and the at least one fake epoch into long short term memory (LSTM) cells, compute hidden states for each of the event epochs and the at least one fake epoch, feed the hidden states into spatial and temporal attention models, and employ an average attention across all event epochs to generate causal graphs representing causal relationships between all the event epochs.

In accordance with yet another embodiment, a non-transitory computer-readable storage medium comprising a computer-readable program for learning relationships between multiple event types by employing a multi-channel neural graphical event model (MCN-GEM) is presented. The non-transitory computer-readable storage medium performs the steps of receiving, by a computing device, time-stamped, asynchronous, irregularly spaced event epochs, generating, by the computing device, at least one fake epoch between each inter-event interval, wherein fake epochs represent negative evidence, feeding the event epochs and the at least one fake epoch into long short term memory (LSTM) cells, computing hidden states for each of the event epochs and the at least one fake epoch, feeding the hidden states into spatial and temporal attention models, and employing an average attention across all event epochs to generate causal graphs representing causal relationships between all the event epochs.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein:

FIG. 2 is an exemplary event dataset over a period of time, in accordance with an embodiment of the present invention;

FIG. 3 is an exemplary conditional intensity function, in accordance with an embodiment of the present invention;

FIG. 4 is an exemplary event dataset including fake labels over a period of time, in accordance with an embodiment of the present invention;

Throughout the drawings, same or similar reference numerals represent the same or similar elements.

DETAILED DESCRIPTION

Figure 1:
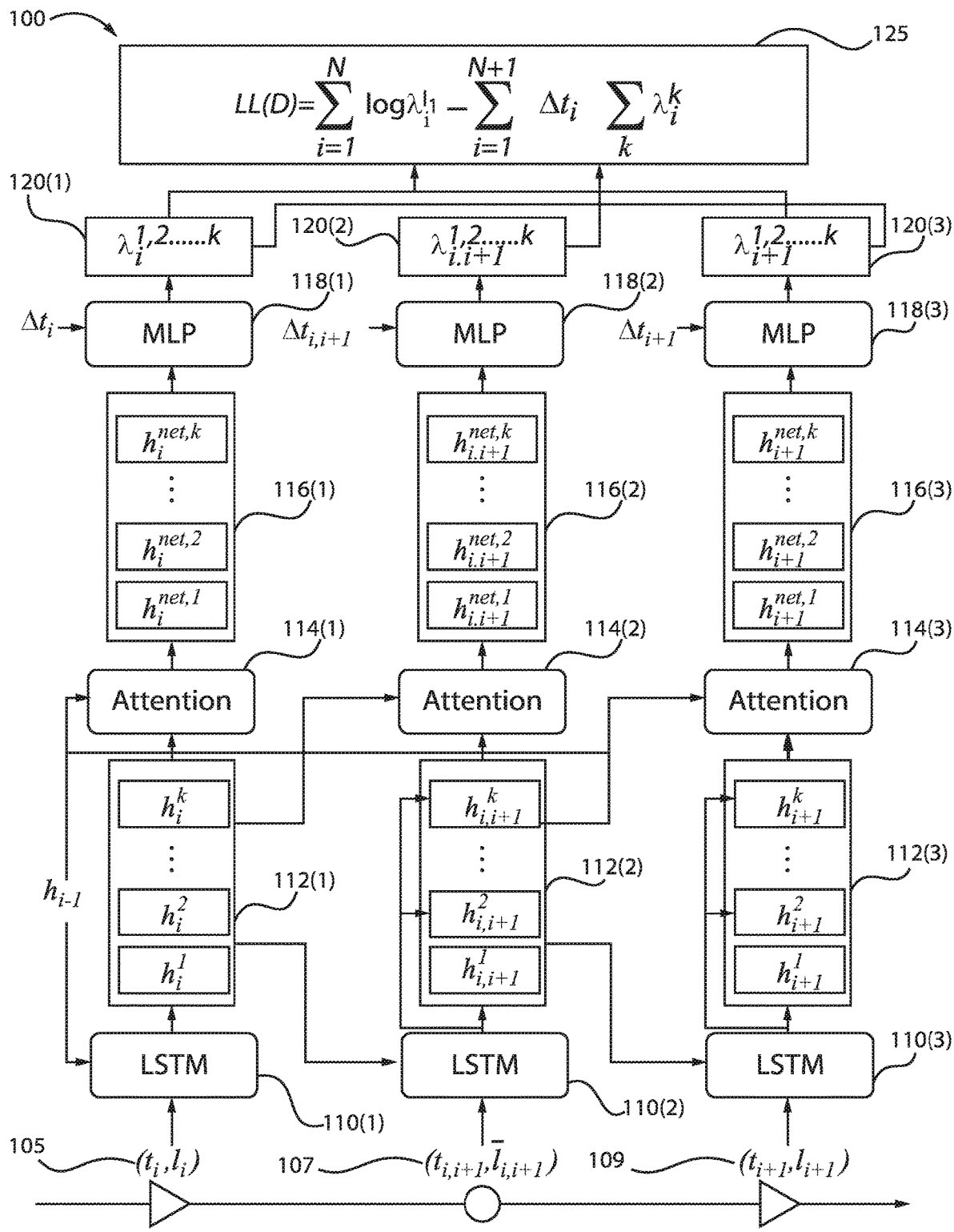
FIG. 1 is an exemplary system of a multi-channel neural graphical event model (MCN-GEM) model with negative evidence, in accordance with an embodiment of the present invention.

Embodiments in accordance with the present invention provide methods and devices for employing negative evidence for generation and prediction with event datasets. Event datasets are sequences of events of various types occurring irregularly over a time-line. Existing work for modeling events using conditional intensities rely on either using some underlying parametric form to capture historical dependencies or on non-parametric models that focus on tasks such as prediction.

Streaming algorithms are able to process an extremely large, even unbounded, data set and compute some desired output using only a constant amount of random access memory (RAM). If the data set is unbounded, it is referred to as a data stream. In such a case, if processing of the data stream is stopped at some position, the streaming algorithm has a solution corresponding to the data seen up to that point. Therefore, streaming algorithms are algorithms for processing data streams in which the input is presented as a sequence of items and can be examined in only a few passes (usually just one). In most models, only the events at observed time epochs are used to obtain the model and intervals between any two consecutive events only contribute to the quadrature of the objective function. As a result, most models do not fully utilize the information of non-events in the intervals between any two consecutive events.

The exemplary embodiments of the present invention employ negative evidence between real event arrival times to improve the learning of statistical and causal relationships between event types using event datasets. The exemplary embodiments can capture arbitrary complex history dependency with a universal approximator, and can achieve this by utilizing the non-event information between intervals as negative evidence to improve the modeling of history. The exemplary embodiments learn from multi-variate time-stamped event data, using a neural graphical model by considering an arbitrary history of all events, and the representation of history is learned automatically via the universal approximator. The exemplary embodiments estimate the conditional instantaneous intensity (or arrival rate) of the child event type from data, e.g., intensity that is conditional on both the presence as well as the absence of the parent event types from historical observation. The exemplary embodiments do so with a separate representation for each event type to model event arrival rates of the successor event types, with a different constant intensity corresponding to each parent-configuration state (absent/present of each parent in a specified time window).

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is an exemplary system of a multi-channel neural graphical event model (MCN-GEM) model with negative evidence, in accordance with an embodiment of the present invention.

An event dataset is denoted as $D=\{(l_i,t_i)\}_{i+1}^{N}$, where $t_i$ is an occurrence time of an $i^{th}$ event, $t_i \in \mathbb{R}^+$, and $l_i$ is an event label corresponding a finite set $\mathcal{L}$ of possible labels (types), where $|\mathcal{L}|=M$. A time ordered dataset is assumed where at most one event can occur at any point in continuous time. Thus, $t_i<t_j$ for $i<j$, with initial time $t_0=0 \le t_1$ and end time $t_{N+1}=T \ge t_N$, where T is a total time period. The strict history is denoted relative to any point t in continuous time as $\mathcal{H}_t$, and this is defined as a sequence of event epochs before time t, e.g., $\{(t_i,l_i|t_i<t\}$. Lastly, $\lambda_t^k|\mathcal{H}_t$ denotes an instantaneous conditional intensity of event type k in label set $\mathcal{L}$ at time t. $\lambda_t^k|\mathcal{H}_t$ governs a history-dependent instantaneous rate of occurrence of event type k at time t. Note that the term epoch is used to denote an event epoch, that is, an event arrival on the timeline.

FIG. 1 shows the overall system of the multi-channel neural graphical event model (MCN-GEM), which includes three main components, that is, a recurrent neural network to represent the continuous time evolution, the introduction of negative evidence between two consecutive arrival epochs, and the multi-channel view with spatial and temporal attention. Negative evidence is defined as the non-observation of events over respective time intervals.

Given a dataset D, a graphical event model (GEM) $\mathcal{G}$ is a directed graph with nodes $\mathcal{L}$ and $\mathcal{E}$. GEM defines a family of marked point processes whose likelihood of data D is:

$$p(D|\theta) = \sum_{l \in \mathcal{L}} \sum_{i=1}^{n} \lambda_{t_i}^{l_i,1_{t_i}}, e^{\int_{t_{i-1}}^{t_i} \sum_{k=1}^{\Delta f} \lambda_\tau^k | \mathcal{H}_\tau d\tau}$$

where the indicator function $1_{l_i}=1$ if $l_i=1$ and zero otherwise.

The log-likelihood (LL) of the event data over interval [0, T] using the conditional intensity functions can be written as:

$$\log L(D) = \sum_{i=1}^{N} \log \lambda_{t_i}^{l_i} \bigg| \mathcal{H}_{l_i} - \sum_{i=1}^{N+1} \int_{t_{i-1}}^{t_i} \sum_{k=1}^{M} \lambda_\tau^k \bigg| \mathcal{H}_\tau d\tau$$

A deep neural network is trained to produce $\lambda_t^k|\mathcal{H}_i$ for each type k. A sequence modeling approach with recurrent neural networks and long short term memory (LSTM) cells is used. The sequence of tokens that is fed into the LSTM network is the temporally ordered event sequence D, where each token corresponds to an event arrival, e.g., a label and a time stamp. To model continuous time, each token is represented in the raw input as a concatenation of its one-hot encoded event label (1-out-of-M) and its continuous-valued time stamp. The internal states of the recurrent LSTM cell evolve in response to each current raw input. It is noted that there are alternative choices for modeling continuous time, such as contextualizing the event label embedding with a time mask.

For an event sequence D, $l_0$ denotes a token that marks the beginning of the sequence and $l_{N+1}$ denotes a token that marks the end of the sequence. Then for each event epoch i in sequence D, $0 \leq i < N+1$, and the hidden state $h_i^k$ is computed for each event label k in the augmented set $\mathcal{L}$ as:

$$h_i^k = \text{LSTM}_k([\text{Emb}(l_i), t_i]; h_{i-1}^k), \forall k \in \mathcal{L}$$

where "Emb" denotes the embedding matrix for label $l_i$. Embedding includes one embedding layer on top of one-hot encoding of labels. $h_{-1}^k$ initialized to be all-zero vectors. For practical computation reasons, sharing the LSTM parameters among different event labels k is sufficient, e.g., $\text{LSTM}_k = \text{LSTM}$.

Referring back to FIG. 1, the MCN-GEM model 100 illustrates three epochs. A first epoch 105 ($t_i, l_i$), a second epoch 107 ($t_{i,i+1}, l_{i,i+1}$), and a third epoch 109 ($t_{i+1}, l_{i+1}$). The first epoch 105 is fed into a recurrent LSTM cell 110(1), the second epoch 107 is fed into a recurrent LSTM cell 110(2), and the third epoch 109 is fed into a recurrent LSTM cell 110(3). Hidden states are computed for each epoch. Hidden states 112(1) are computed based on epoch 105, hidden states 112(2) are computed based on epoch 107, and hidden states 112(3) are computed based on epoch 109. Hidden states are fed into attention models 114(1), 114(2), and 114(3). Further net hidden states 116(1), 116(2), and 116(3) are computed from the spatial and temporal attentions. Spatial attention is a way to model inter-label dependence, as in graphical event models, and temporal attention is a way to model the lagged dependence on parental event history. The net hidden states 116(1), 116(2), 116(3) are fed into feed-forward layers 118(1), 118(2), and 118(3), respectively, at different time intervals, such that the net hidden states 116(1), 116(2), 116(3) are provided to the λ-networks 120 (1), 120(2), and 120(3), respectively. To train the MCN-GEM, the same LL function as noted above is used with the assumption of constant intensity in between two consecutive events, real or fake, and this leads to equation 125:

$$LL(D) = \sum_{i=1}^{N} \log \lambda_i^{l_i} - \sum_{i=1}^{N+1} \Delta t_i \sum_k \lambda_i^k$$

FIG. 2 is an exemplary event dataset over a period of time, in accordance with an embodiment of the present invention.

In the exemplary dataset 150, different event types can occur over time. For instance, three different event types are illustrated, that is, prescription refill 152, hospital admission 154, and home health visit 156. These event types 152, 154, 156 can be asynchronous, randomly, and irregularly spaced. Event types 152, 154, 156 are events of various types occurring irregularly over the time-line 155. In other words, multiple labels occur randomly, irregularly, and asynchronously on a common time line, and a model and representation are necessary to enable effective automated generation and prediction of imminent events for alerts, feedback, control, and decision-making in an automated manner. Other event datasets can include, but are not limited to, web logs, customer transactions, network notifications, political events, financial events, insurance claims, health episodes, etc.

FIG. 3 is an exemplary conditional intensity function 160, in accordance with an embodiment of the present invention.

Negative evidence is used between real event arrival times to improve the learning of statistical and causal relationships between event types using event datasets. Negative evidence is defined as the non-observation of events over respective time intervals.

An inter-event interval is a source of information for modeling event data, e.g., not only is the presence of an event at a point in continuous time a useful signal for learning, but also the very absence of an event at a point in time. The exemplary embodiments of the present invention trian models to explicitly reinforce this negative evidence by introducing an auxiliary label into the label set L and refer to it as the "fake label." The exemplary embodiments then interject or insert within each inter-event interval a certain number of fake epochs (e.g., with the auxiliary label) that are spread uniformly in time over the interval. The fake event epoch then participates in the recurrent computations much like any other real event epoch. The log-likelihood of the event data over interval [0, T] using the conditional intensity functions can be written as Equation 160:

$$\log L(D) = \sum_{i=1}^{N} \log \lambda_{t_i}^{l_i} \bigg| \mathcal{H}_{t_i} - \sum_{i=1}^{N+1} \int_{t_{i-1}}^{t_i} \sum_{k=1}^{M} \lambda_\tau^k \bigg| \mathcal{H}_\tau d\tau$$

FIG. 4 is an exemplary event dataset including fake labels over a period of time, in accordance with an embodiment of the present invention.

The timeline 170 depicts a plurality of time-stamped, asynchronous, irregularly spaced epochs 174 and a plurality of fake epochs 172. The fake epochs 172 can be inserted between each inter-event interval. Thus, the fake epochs 172 can exist in every interval. The fake epochs 172 can exist randomly in any subset of these intervals and with different numbers as well.

The exemplary embodiments thus exploit a novel signal in the data, that is, negative evidence, by employing fake labels 172, where negative evidence is the absence of event occurrences over respective intervals of time on a common timeline. The exemplary embodiments combine the negative evidence with a multi-channel architecture for effectively learning over multiple time scales across event types. The exemplary embodiments exploit the multi-channel representation to enable spatio-temporal attention across time and across channels to realize an effective automated system for generation and prediction of imminent events for alerts, feedback, control, and decision-making in an automated manner.

Figure 5:
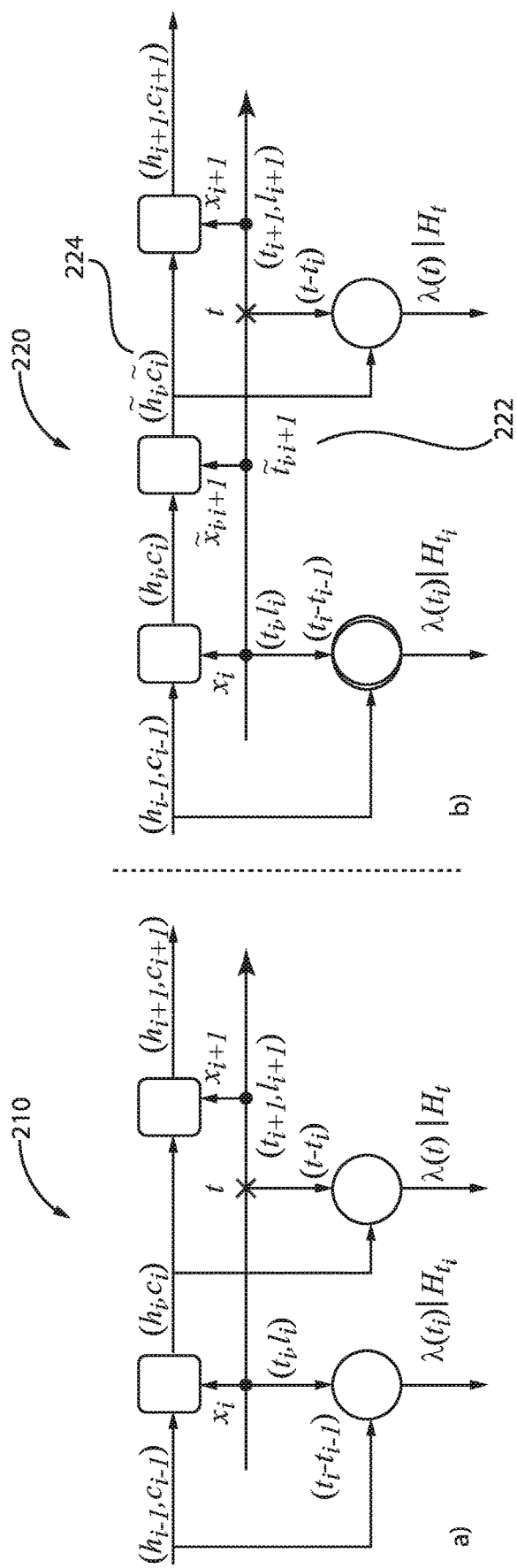
FIG. 5 is an exemplary deep sequential model for conditional intensity including a basic model and a model with fake event epochs to reinforce negative evidence, in accordance with an embodiment of the present invention.

FIG. 5 is an exemplary deep sequential model for conditional intensity including a basic model and a model with fake event epochs to reinforce negative evidence, in accordance with an embodiment of the present invention.

Illustration 210 shows a basic model for history dependent conditional intensity. The black lines show the common timeline on which two consecutive epochs ($t_i, l_i$) are depicted. The upper half shows the recurrent cells unrolled in time, and the bottom half shows a neural network layer, namely the λ-network, to produce the instantaneous conditional intensity vector λ. The recurrent cell receives two inputs at each sequential token (event arrival), that is, the raw input $x_i$ which is the concatenation of the one-hot encoded event label $l_i$ and the time stamp $t_i$, and the penultimate value of the internal states ($h_{i-1}, c_{i-1}$). The sub-network that produces the conditional intensity ($\lambda(t)|\mathcal{H}_t$) takes two inputs, that is, the most recent internal states that are strictly before t, e.g., in correspondence with the most recent event (say at $t_i < t$), and the duration ($t - t_i$).

Now, modeling a continuous time history with negative evidence will be described including motivation on new interval state representation.

It is noted that the internal states $(h_i, c_i)$ in the basic model evolve discretely across tokens while staying fixed in between tokens. In event modeling, the inter-event duration between any two consecutive events is just as important as the event arrivals themselves, as evident from the integral terms in Equation 160. As such, the internal states of the sequential model also reflect the continuous passage of time in between successive events. The exemplary embodiments of the present invention introduce the use of "fake epochs" to reinforce the negative evidence of no observable events within each inter-event dead-space as shown in illustration 220.

Regarding fake epochs as negative evidence, the exemplary embodiments introduce an auxiliary $(M+1)^{th}$ label into the label set $\mathcal{L}$, and refer to it as the "fake label." The method then interjects within each inter-event interval a certain number K of fake epochs (e.g., with label M+1) that are spread uniformly in time over the interval. Note that K is a hyperparameter, and illustration 220 shows one fake epoch (K=1) introduced at $\tilde{t}_{i,i+1}$, 222, which is the center of $[t_i, t_{i+1}]$.

The fake event epoch then participates in the recurrent computations like any other real event epoch. The fake epoch allows using the LSTM dynamics to further evolve the internal states within each inter-event interval, albeit in a discrete manner, e.g., at each such fake event epoch on the timeline. The resulting finer sequence of internal states is then a summary of all the event trace history as well as the passage of time in the intervening dead-space intervals. The internal state has evolved to $(\tilde{h}_i, \tilde{c}_i)$, 224, in the interior of the interval. The fake event epochs also allow the computation of the integral terms in Equation 160. The exemplary method takes a numerical quadrature procedure using the fake epoch time stamps as the sampling time points for the quadrature. It is noted that while the entire inter-event interval corresponds to negative evidence in theory, the finite approximation suffices in practice. Lastly, while the conditional intensity corresponding to the fake label doesn't enter Equation 160 in any way, the exemplary method uses it to regularize the learning objective via a target-label reconstruction term.

In multivariate event data, the different labels can have different arrival rates. Further, the multivariate event data can mutually influence the arrival rates of each other in label-specific ways in the sense of graphical event models. It is therefore desirable to model a label-specific hidden state. This is achieved by associating each label with a corresponding partition of a single hidden state vector. The exemplary method achieves this by choosing the hidden state dimension to be an integer multiple of the number of labels, e.g., m(M+1) for some positive integer m, and effectively realize an m-dimensional hidden state for each label in $\mathcal{L}$. These label-specific sub-vectors are selectively channeled for computing the label-specific rates through the network layer in FIG. 5. Such a multi-channel view also enables modeling temporal and spatial attention within the λ-network.

Figure 6:
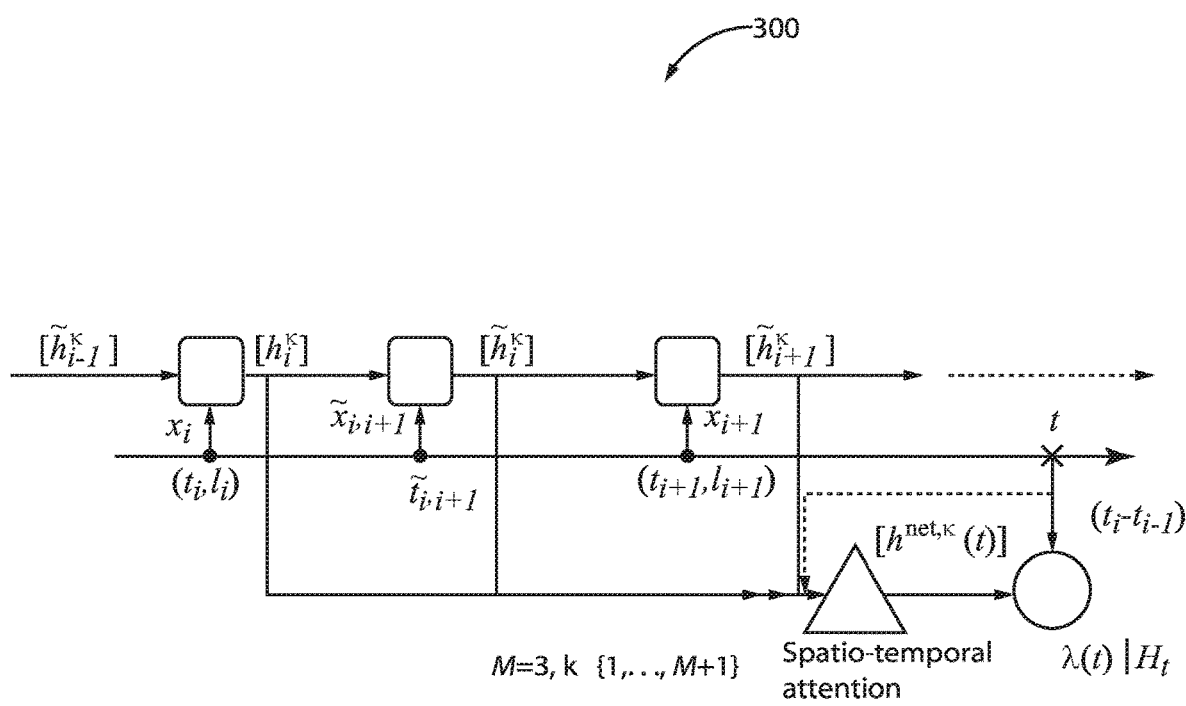
FIG. 6 is an exemplary spatio-temporal attention for deep graphical event models, in accordance with an embodiment of the present invention.

FIG. 6 is an exemplary spatio-temporal attention 300 for deep graphical event models, in accordance with an embodiment of the present invention.

The goal is to obtain the underlying (causal) graph among events. Regarding the MCN-GEM, each event has separate hidden states and updates themselves. Regarding attention, the exemplary method uses spatio-temporal attention to find a subset of history states that most related to the current states across all channels. Regarding the graph, the exemplary method uses the average attention across all events to obtain the (causal) graphs.

Spatial attention is a way to model inter-label dependence, as in graphical event models, and temporal attention is a way to model the lagged dependence on parental event history. For example, in a piece-wise constant intensity model, the active basis functions include lagged intervals relative to any point in time. These two types of dependence are achieved by maintaining a memory bank $\mathcal{M}$ of historical label-specific hidden states that span the most recent J event arrivals. Note that the above multi-channel view gives a total of M*J hidden state sub-vectors in $\mathcal{M}$, e.g., one hidden-state sub-vector for each real label and for each time-stamp corresponding to the most recent J event arrivals. These raw hidden states in the memory bank are combined using an attention mechanism 114(1), 114(2), 114(3) into a net hidden state 116(1), 116(2), 116(3) that becomes input for the lambda-network (120(1), 120(2), 120(3)).

FIG. 6 shows this for J=3, where $[h_i^k]$ denotes a list of hidden states indexed by label k, and at time $t_i$. The attention block produces a corresponding list of net hidden states $[h_i^{net,k}]$ which enter the λ-network to produce conditional intensities for each label at time t.

By adding an attention layer after $h_i^k$, intensity rates can be shown to credit the relevant event occurrences in history. The memory bank $\mathcal{M}_i$ (for each epoch i) has size J×M to store the raw hidden states of each of M channels from the most recent J epochs relative to i, e.g., from (i−J) until (i−1). Note that J is a constant hyperparameter in the model.

The net attentive hidden state is given as:

$$h_i^{net,k} = \tanh(W_c[c_i^k, h_i^k]), \forall k \in \mathcal{L}$$

Where $c_i$ is the context vector at epoch i, and is computed as a weighted average of the raw hidden states in $\mathcal{M}_i$. The weighting is done by an alignment vector $\alpha_i^k$, e.g., $c_i^k = \Sigma_m \alpha_{im}^k h_m$, where $h_m$ is each raw label-specific hidden state in the memory bank $\mathcal{M}_i$. Note that index m runs over each of the JM hidden states in $\mathcal{M}$ thereby giving both temporal and spatial attention. $W_c$ represents weights to compute new hidden representation given attention. The attention weight $\alpha_{im}^k$ is derived by comparing the current raw hidden state $h_i^k$ to each raw hidden state $h_m$ in the memory bank at time i:

$$a_{im}^k = \text{align}(h_i^k, h_m) = \frac{\exp(\text{score}(h_i^k, h_m))}{\sum_m \exp(\text{score}(h_i^k, h_m))}$$

Where $\text{score}(h_i^k, h_m) = (h_i^k)^T h_m$. It is noted that other types of attentions can be used as well in the above spatiotemporal attention model.

Then, in a training phase, the method uses two feed-forward layers to learn intensity rate $\lambda_{t_{i+1}}^k$ given the net hidden state $h_i^{net,k}$ and time interval $\Delta t_{i+1} = t_{i+1} - t_i$:

$$\lambda_{t_{i+1}}^k | \mathcal{H}_{t_i} = \sigma_2(f_2(\sigma_1 f_1([h_i^{net,k}, \Delta t_{i+1}]))), \forall k \in \mathcal{L}$$

where f1 and f2 are feed-forward neural layers. The method uses a ReLU and softplus activation function for $\sigma_1(\cdot)$ and $\sigma_2(\cdot)$, respectively. The Softplus activation ensures a positive conditional intensity.

To train the MCN-GEM, the exemplary embodiments use the same log-likelihood (LL) function as in Equation 160 with the assumption of constant intensity in between two consecutive events, real or fake, and this leads to:

$$LL(D) = \sum_{i=1}^{N} \log \lambda_i^{l_i} \left| \mathcal{H}_{t_i} - \sum_{i=1}^{N+1} \Delta t_i \sum_{k=1}^{M} \lambda_{t_i}^{k} \right| \mathcal{H}_{t_i}$$

Where $\Delta t_i = t_i - t_{i-1}$ is the time interval since the last event.

In addition, since the exemplary model is the most non-parametric compared to other related work, adding two regularization terms helps with generalization. First, the exemplary method considers the target prediction loss $\mathcal{L}_p$ of the next event label $l_{i+1}$ given $\lambda_{t_{i+1}}^{k}$, for which the exemplary method uses a cross entropy loss between ground truth $l_{i+1}$ and softmax $(\lambda_{t_{i+1}})$. This classification loss also emphasizes the adversarial nature between real and fake epochs. Second, the exemplary method adds another term $\mathcal{L}_w$ which penalizes the $\mathcal{L}_2$-norm of the weights on f1 and f2. Hence, the overall regularized objective for training is as follows:

$$\mathcal{L}_{train} = LL(D) + \lambda_p \mathcal{L}_p + \lambda_w \mathcal{L}_w$$

For the model fitting computation task, the overall likelihood objective for training is computed above. The testing loss is simply computed as LL(D), since the goal is to gauge how well the model fits the data.

In summary, a new multi-scale multi-channel neural GEM with two-dimensional attentions for modeling event sequences is presented. The exemplary model exploits the negative evidence of no observable events in each successive inter-event duration by introducing fake epochs, which eliminates the need to assume specific functional forms. This makes the exemplary approach practically appealing with respect to approximately capturing the variation of hidden states in continuous time in a non-parametric manner. The exemplary model combines the framework of GEMs and the modeling power of deep neural networks. Alongside the lambda-network in FIG. 5, a parallel integral-lambda-network could be used to learn the integral terms in Equation 160 with a constraint that connects these two networks and their parameters. The focus of the exemplary model with negative evidence is to fit a model for learning dependencies in event stream data. The exemplary model requires full visibility into the event sequence for the purposes of placement or sampling of the fake epochs.

Consequently, the exemplary embodiments learn the statistical and causal co-occurrence relationships among multiple event types, assuming only time-stamped, asynchronous, irregularly spaced event occurrence data on the time line spanning multiple event types as input, without limitation of source (such as computer programs or linguistic assessment) or limitation of application (beyond just decision support). Further, the exemplary method can capture arbitrary complex history dependency with a universal approximator (neural network), and the exemplary method achieves its effectiveness by utilizing the non-event information between intervals as negative evidence to improve the modeling of history. The exemplary embodiments learn from multi-variate time-stamped event data, using a neural graphical model by considering arbitrary history of all events, and the representation of history is learned automatically via the universal approximator. The exemplary embodiments estimate the conditional instantaneous intensity (or arrival rate) of the child event type from data, e.g., intensity that is conditional on both the presence as well as the absence of the parent event types from historical observation. The exemplary embodiments do so with a separate representation for each event type to model event arrival rates of the successor event types, with a different constant intensity corresponding to each parent-configuration state (absent/present of each parent in a specified time window). The exemplary embodiments employ a multi-channel recurrent neural network to learn event type specific representations of histories and provide specific ways to generate negative evidence using sampling strategies between any two observed events, as well as the use of spatial-temporal attention to generate graphical relationships that are interpretable and explainable. The exemplary embodiments also learn the expected duration between any connected occurrences involving any event types from data, and use of such an expected duration in estimating the causal and co-occurrence of events.

Stated differently, a non-parametric deep learning approach for multivariate event data sets in continuous time is introduced. History-dependent conditional intensity functions are learned in a fully data-driven, non-parametric manner, that is, by using only network weights and activation functions, and by learning a suitable representation of all available (strict) histories. The inter-event interval is a beneficial source of information for modeling event data. In other words, not only is the presence of an event at a point in continuous time a useful signal for learning, but also the very absence of an event at a point in time. The exemplary deep learning model of the exemplary embodiments explicitly reinforces this negative evidence. A multi-scale, multi-channel sequential representation that is sensitive to the base rate of various evet types is presented.

Figure 7:
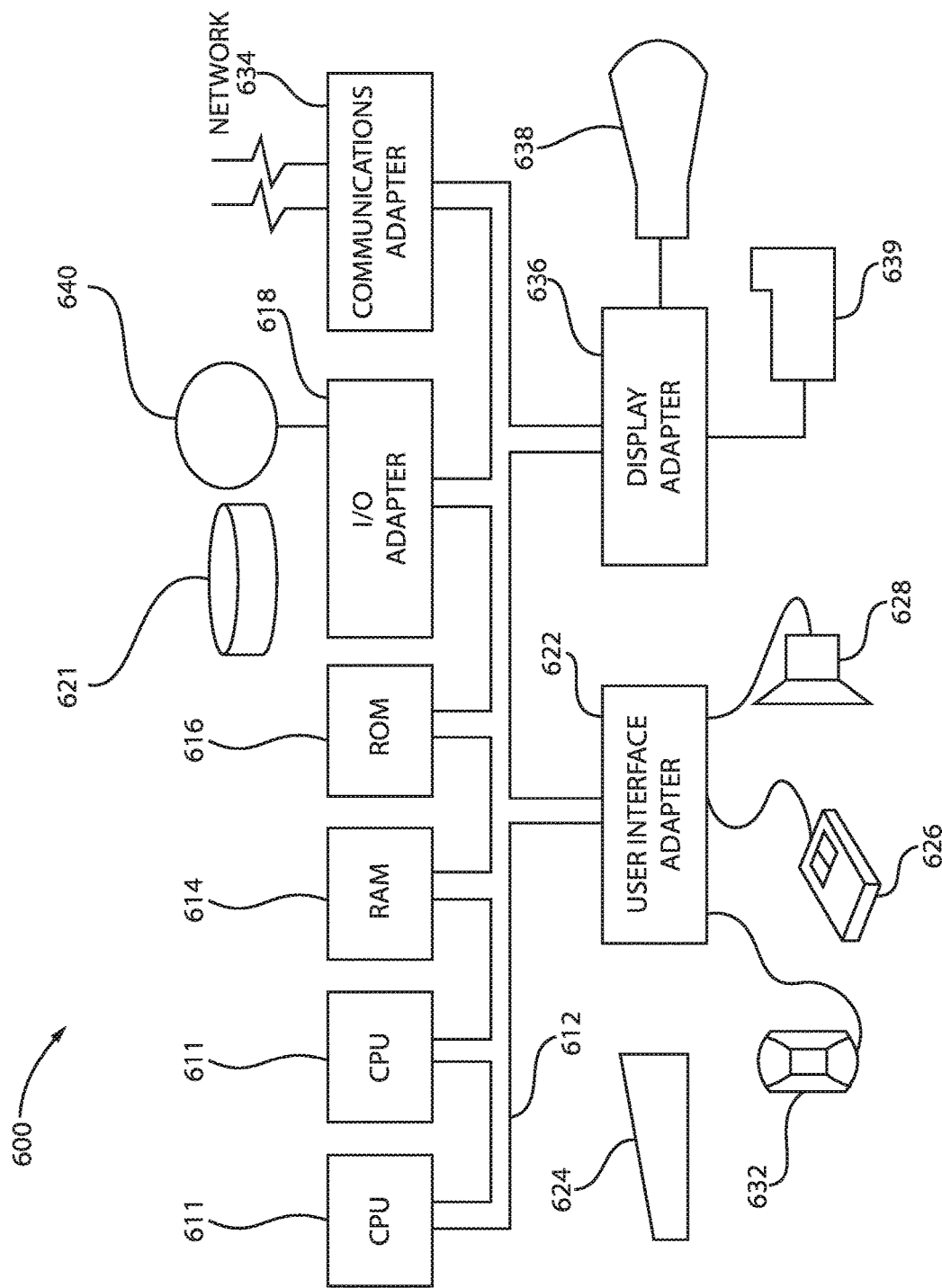
FIG. 7 is an exemplary processing system, in accordance with an embodiment of the present invention.

FIG. 7 is an exemplary processing system for handling streaming algorithms, in accordance with embodiments of the present invention.

Referring now to FIG. 7, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

Figure 8:
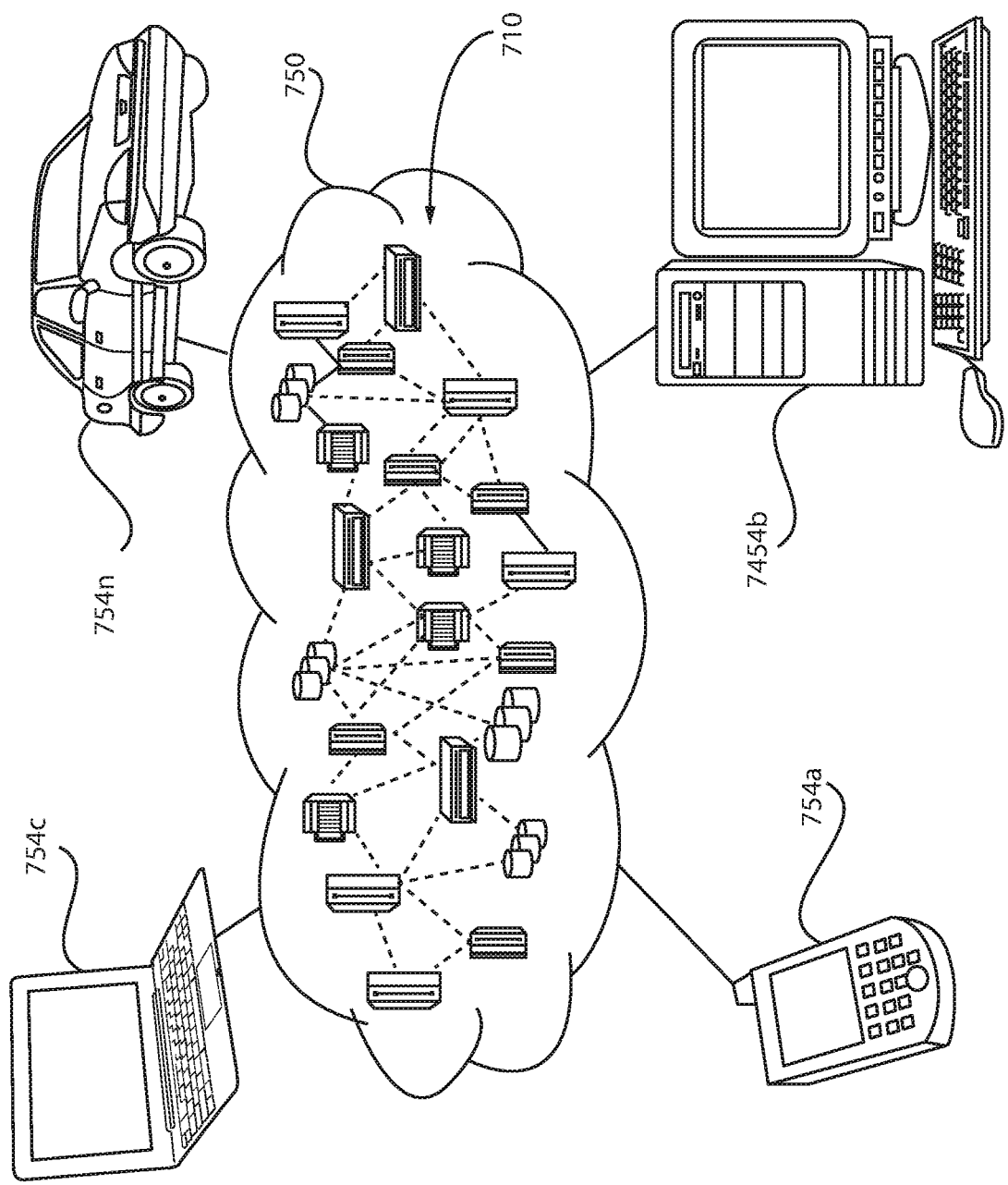
FIG. 8 is a block/flow diagram of an exemplary cloud computing environment, in accordance with an embodiment of the present invention.

FIG. 8 is a block/flow diagram of an exemplary cloud computing environment, in accordance with an embodiment of the present invention.

FIG. 8 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 750 is depicted for enabling use cases of the present invention. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N can communicate. Nodes 710 can communicate with one another. They can be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 8 are intended to be illustrative only and that computing nodes 710 and cloud computing environment 750 can communicate with any type of computerized device over any type of network and/or network addressable connection (e.g., using a web browser).

Figure 9:
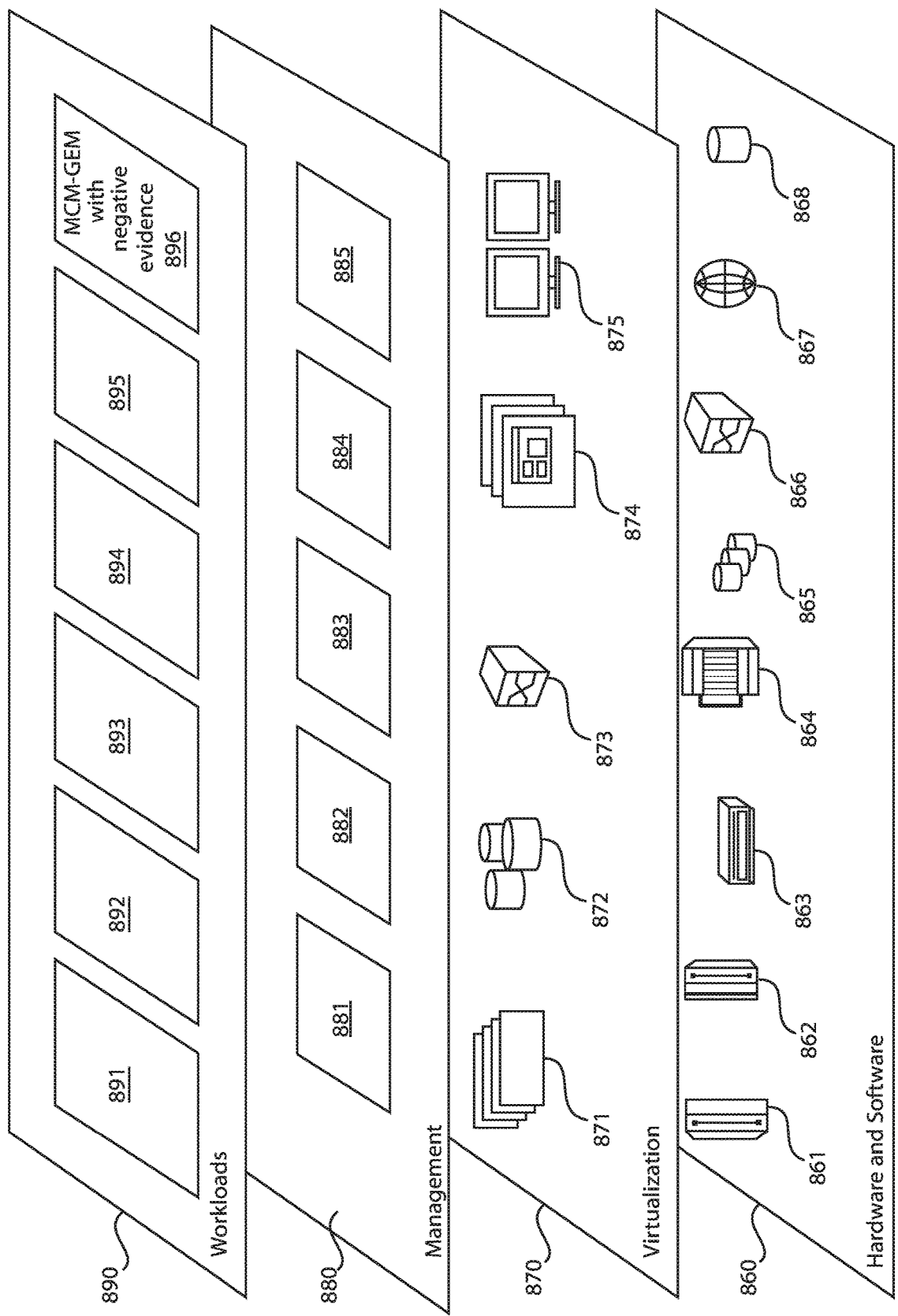
FIG. 9 is a schematic diagram of exemplary abstraction model layers, in accordance with an embodiment of the present invention.

FIG. 9 is a schematic diagram of exemplary abstraction model layers, in accordance with an embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities can be provided: virtual servers 871; virtual storage 872; virtual networks 873, including virtual private networks; virtual applications and operating systems 874; and virtual clients 875.

In one example, management layer 880 can provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment can be utilized. Examples of workloads and functions which can be provided from this layer include: mapping and navigation 891; software development and lifecycle management 892; virtual classroom education delivery 893; data analytics processing 894; transaction processing 895; and a MCN-GEM with negative evidence 896.

Figure 10:
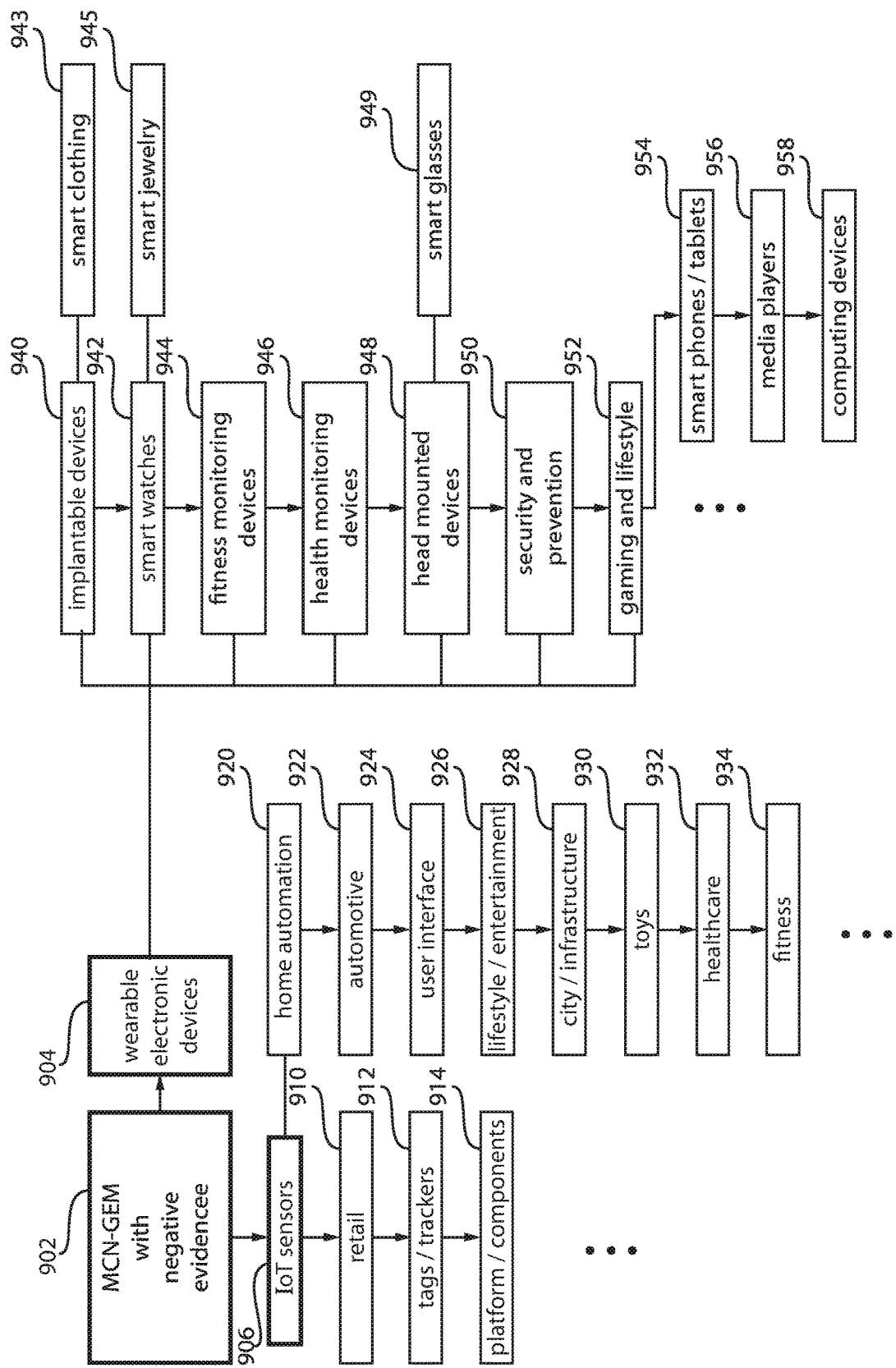
FIG. 10 is a block/flow diagram of a method for applying MCN-GEM model with Internet of Things (IoT) systems/devices/infrastructure, in accordance with an embodiment of the present invention.

FIG. 10 is a block/flow diagram of a method for applying an open loop integration scheme in Internet of Things (IoT) systems/devices/infrastructure, in accordance with embodiments of the present invention.

According to some embodiments of the invention, a network is implemented using an IoT methodology. For example, the MCN-GEM with negative evidence 902 can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The MCN-GEM with negative evidence 902 described herein can be incorporated into any type of electronic devices for any type of use or application or operation.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the MCN-GEM with negative evidence 902 of the present invention can be incorporated into a variety of different devices and/or systems. For example, the MCN-GEM with negative evidence 902 can be incorporated into wearable or portable electronic devices 904. Wearable/portable electronic devices 904 can include implantable devices 940, such as smart clothing 943. Wearable/portable devices 904 can include smart watches 942, as well as smart jewelry 945. Wearable/portable devices 904 can further include fitness monitoring devices 944, health and wellness monitoring devices 946, head-mounted devices 948 (e.g., smart glasses 949), security and prevention systems 950, gaming and lifestyle devices 952, smart phones/tablets 954, media players 956, and/or computers/computing devices 958.

The MCN-GEM with negative evidence 902 of the present invention can be further incorporated into Internet of Thing (IoT) sensors 906 for various applications, such as home automation 920, automotive 922, user interface 924, lifestyle and/or entertainment 926, city and/or infrastructure 928, retail 910, tags and/or trackers 912, platform and components 914, toys 930, and/or healthcare 932, as well as fitness 934. The IoT sensors 906 can employ the MCN-GEM with negative evidence 902. Of course, one skilled in the art can contemplate incorporating such MCN-GEM with negative evidence 902 into any type of electronic devices for any types of applications, not limited to the ones described herein.

Figure 11:
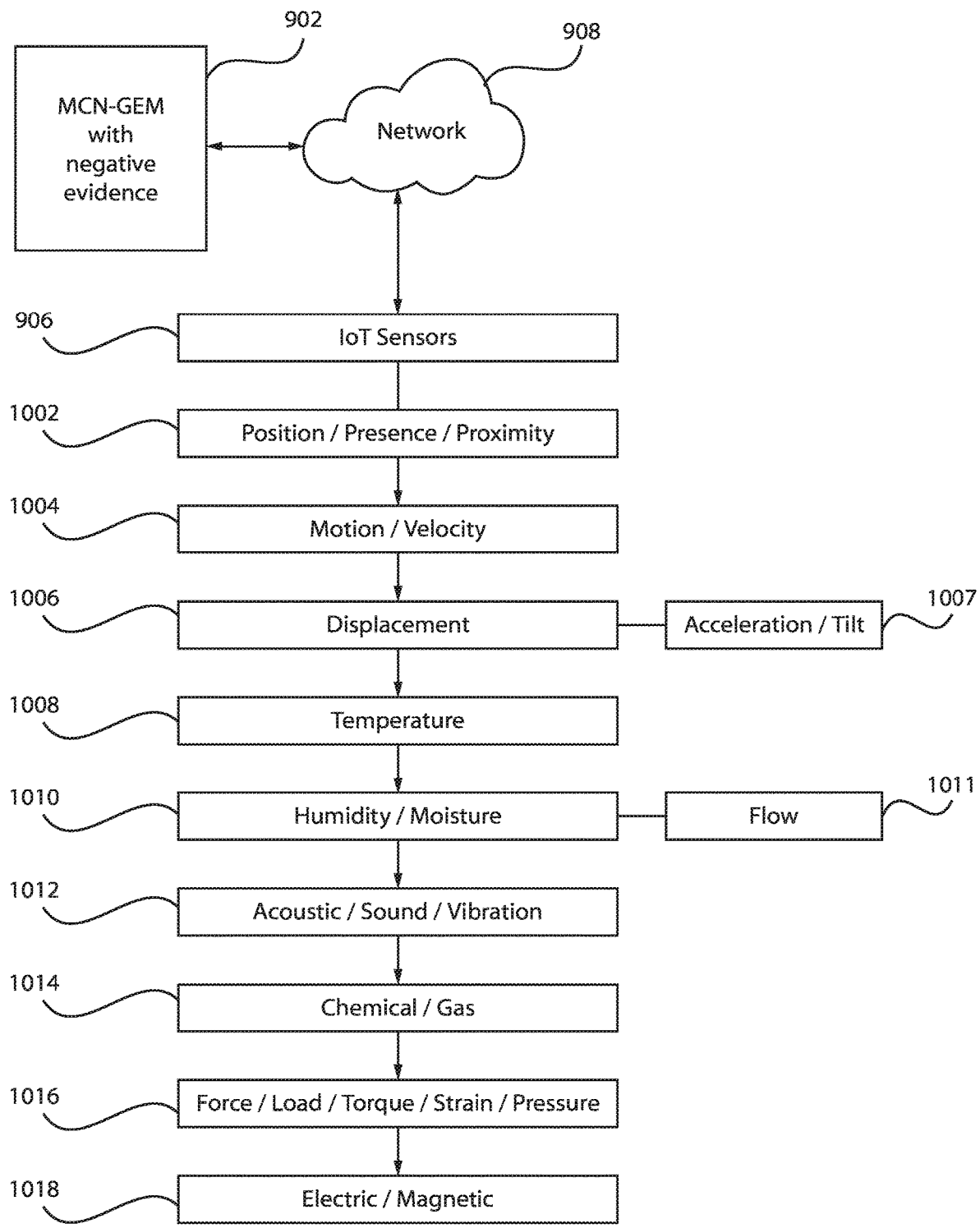
FIG. 11 is a block/flow diagram of exemplary IoT sensors used to collect data/information related to the MCN-GEM model, in accordance with an embodiment of the present invention.

FIG. 11 is a block/flow diagram of exemplary IoT sensors used to collect data/information related to the open loop integration scheme streaming algorithm, in accordance with embodiments of the present invention.

IoT loses its distinction without sensors. IoT sensors act as defining instruments which transform IoT from a standard passive network of devices into an active system capable of real-world integration.

The IoT sensors 906 can employ the MCN-GEM with negative evidence 902 to transmit information/data, continuously and in in real-time, via a network 908, to any type of distributed system. Exemplary IoT sensors 906 can include, but are not limited to, position/presence/proximity sensors 1002, motion/velocity sensors 1004, displacement sensors 1006, such as acceleration/tilt sensors 1007, temperature sensors 1008, humidity/moisture sensors 1010, as well as flow sensors 1011, acoustic/sound/vibration sensors 1012, chemical/gas sensors 1014, force/load/torque/strain/pressure sensors 1016, and/or electric/magnetic sensors 1018. One skilled in the art can contemplate using any combination of such sensors to collect data/information via MCN-GEM with negative evidence 902 of the distributed system for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Figure 12:
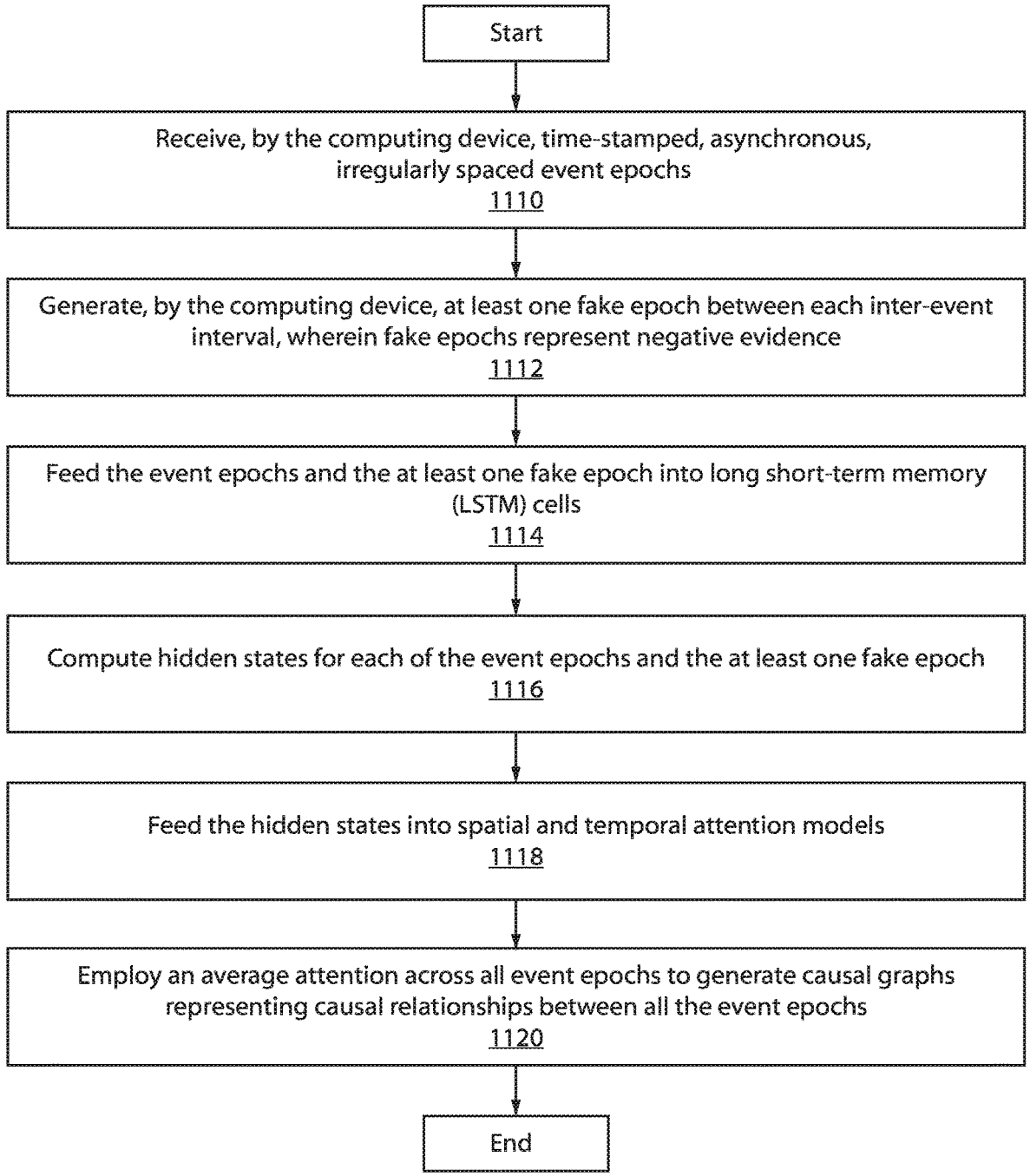
FIG. 12 is a block/flow diagram of an exemplary method for learning relationships between multiple event types, in accordance with an embodiment of the present invention.

FIG. 12 is a block/flow diagram of an exemplary method for learning relationships between multiple event types, in accordance with an embodiment of the present invention.

At block 1110, receive, by a computing device, time-stamped, asynchronous, irregularly spaced event epochs.

At block 1112, generate, by the computing device, at least one fake epoch between each inter-event interval, wherein fake epochs represent negative evidence.

At block 1114, feed the event epochs and the at least one fake epoch into long short term memory (LSTM) cells.

At block 1116, compute hidden states for each of the event epochs and the at least one fake epoch.

At block 1118, feed the hidden states into spatial and temporal attention models.

At block 1120, employ an average attention across all event epochs to generate causal graphs representing causal relationships between all the event epochs.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for using negative evidence to predict event datasets (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for learning relationships between multiple event types by employing a multi-channel neural graphical event model (MCN-GEM), comprising:
    inserting, by a computing device, at least one fake epoch between each inter-event interval from time-stamped, asynchronous, irregularly spaced event epochs collected from a plurality of sensors, wherein fake epochs represent negative evidence;
    determining hidden states with long short term memory (LSTM) cells of the MCN-GEM for each of the event epochs and the at least one fake epoch;
    modeling inter-label dependence and lagged dependence on event history by combining the hidden states maintained in memory banks of spatial attention and temporal attention models of the MCN-GEM into net hidden states;
    learning an intensity rate using the net hidden states by employing feed-forward neural layers of the MCN-GEM at different time intervals to provide the net hidden states to lambda-neural network layers of the MCN-GEM;
    learning, with the MCN-GEM, an adversarial nature of the event epochs and the fake epochs through a regularized training objective of a log-likelihood function based on the intensity rate that includes, a target prediction loss of a next event label, and a regularization term that penalizes weights of the feed forward neural layers;
    learning, with the MON-GEM, expected durations between the event epochs based on the adversarial nature of the event epochs and the fake epochs by employing an average attention across all event epochs; and
    autonomously generating, with the MCN-GEM, causal graphs from the expected durations, the causal graphs representing causal relationships between all the event epochs that include predictions of imminent events.

2. The method of claim 1, wherein negative evidence is a non-observation of events over respective time intervals.

3. The method of claim 1, wherein history-dependent conditional intensity functions are learned in a fully data-driven, non-parametric manner.

4. The method of claim 1, wherein a label of an epoch from the event epochs is associated with a corresponding partition of a single hidden state vector to define label-specific sub-vectors.

5. The method of claim 4, wherein the label-specific sub-vectors are selectively channeled for determining label-specific rates through a network layer.

6. The method of claim 1, wherein the MCN-GEM is trained by using the log-likelihood function with constant intensity between two consecutive events, real or fake.

7. The computer-implemented method of claim 1, further comprising controlling an electronic device to generate notifications transmitted through a network to communicate with a user regarding the imminent events wherein the electronic device includes internet of things (IoT) sensors for home automation.

8. A non-transitory computer-readable storage medium comprising a computer-readable program executed on a processor in a data processing system for learning relationships between multiple event types by employing a multi-channel neural graphical event model (MCN-GEM), wherein the computer-readable program when executed on the processor causes a computer to perform the steps of:
    inserting, by a computing device, at least one fake epoch between each inter-event interval from time-stamped, asynchronous, irregularly spaced event epochs collected from a plurality of sensors, wherein fake epochs represent negative evidence;
    determining hidden states with long short term memory (LSTM) cells of the MCN-GEM for each of the event epochs and the at least one fake epoch;
    modeling inter-label dependence and lagged dependence on event history by combining the hidden states maintained in memory banks of spatial attention and temporal attention models of the MCN-GEM into net hidden states;
    learning an intensity rate using the net hidden states by employing feed-forward neural layers of the MCN-GEM at different time intervals to provide the net hidden states to lambda-neural network layers of the MCN-GEM;
    learning, with the MCN-GEM, an adversarial nature of the event epochs and the fake epochs through a regularized training objective of a log-likelihood function based on the intensity rate that includes, a target prediction loss of a next event label, and a regularization term that penalizes weights of the feed-forward neural layers;
    learning, with the MCN-GEM, expected durations between the event epochs based on the adversarial nature of the event epochs and the fake epochs by employing an average attention across all event epochs; and
    autonomously generating, with the MCN-GEM, causal graphs from the expected durations, the causal graphs representing causal relationships between all the event epochs that include predictions of imminent events.

9. The non-transitory computer-readable storage medium of claim 8, wherein negative evidence is a non-observation of events over respective time intervals.

10. The non-transitory computer-readable storage medium of claim 8, wherein history-dependent conditional intensity functions are learned in a fully data-driven, non-parametric manner.

11. The non-transitory computer-readable storage medium of claim 8, wherein a label of an epoch from the event epochs is associated with a corresponding partition of a single hidden state vector to define label-specific sub-vectors.

12. The non-transitory computer-readable storage medium of claim 11, wherein the label-specific sub-vectors are selectively channeled for determining label-specific rates through a network layer.

13. The non-transitory computer-readable storage medium of claim 8, wherein the MCN-GEM is trained by using the log-likelihood (LL) function with constant intensity between two consecutive events, real or fake.

14. The non-transitory computer-readable storage medium of claim 8, further comprising controlling an electronic device to generate notifications transmitted through a network to communicate with a user regarding the imminent events wherein the electronic device includes wearable electronic devices for fitness tracking.

15. A system for learning relationships between multiple event types by employing a multi-channel neural graphical event model (MCN-GEM), the system comprising:
   a memory; and
   one or more processors in communication with the memory configured to:
      receive time-stamped, asynchronous, irregularly spaced event epochs from data collected from a plurality of sensors;
      generate, by a computing device, at least one fake epoch between each inter-event interval, wherein fake epochs represent negative evidence;
      determine hidden states with long short term memory (LSTM) cells of the MCN-GEM for each of the event epochs and the at least one fake epoch;
      model inter-label dependence and lagged dependence on event history by combining the hidden states maintained in memory banks of spatial attention and temporal attention models of the MCN-GEM into net hidden states;
      learn an intensity rate using the net hidden states by employing feed-forward neural layers of the MCN-GEM at different time intervals to provide the net hidden states to lambda-neural network layers of the MCN-GEM;
      learn, with the MCN-GEM, an adversarial nature of the event epochs and the fake epochs through a regularized training objective of a log-likelihood function based on the intensity rate that includes a target prediction loss of a next event label, and a regularization term that penalizes weights of the feed-forward neural layers;
      learn, with the MCN-GEM, expected durations between the event epochs based on the adversarial nature of the event epochs and the fake epochs by employing an average attention across all event epochs to learn an expected duration between all the event epochs; and
      autonomously generate, with the MCN-GEM, causal graphs from the expected durations, the causal graphs representing causal relationships between all the event epochs that include predictions of imminent events.

16. The system of claim 15, wherein negative evidence is a non-observation of events over respective time intervals.

17. The system of claim 15, wherein history-dependent conditional intensity functions are learned in a fully data-driven, non-parametric manner.

18. The system of claim 15, wherein a label of an epoch from the event epochs is associated with a corresponding partition of a single hidden state vector to define label-specific sub-vectors.

19. The system of claim 18, wherein the label-specific sub-vectors are selectively channeled for determining label-specific rates through a network layer.

20. The system of claim 15, further comprising controlling implantable electronic devices for health and wellness monitoring to generate notifications transmitted through a network to communicate with a user regarding the imminent events to monitor health of the user.

* * * * *